Feb. 20, 1934.  P. A. JERGUSON  1,947,910
LIQUID GAUGE
Filed April 6, 1931
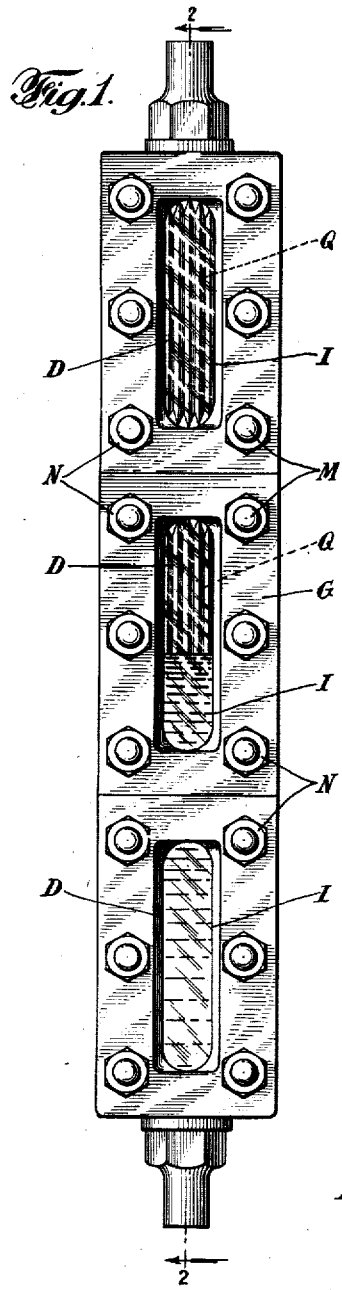
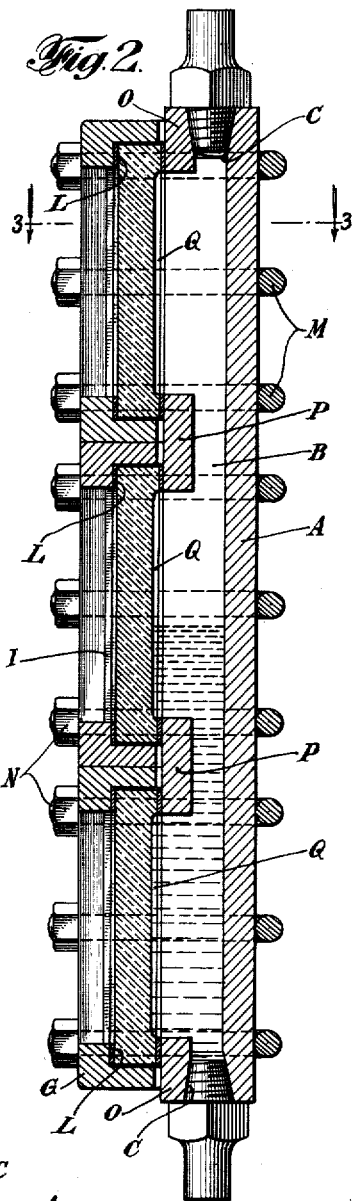
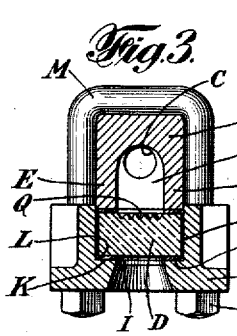

Patented Feb. 20, 1934

1,947,910

UNITED STATES PATENT OFFICE 1,947,910

LIQUID GAUGE

Philip A. Jerguson, West Medford, Mass.

Application April 6, 1931. Serial No. 527,973

3 Claims. (Cl. 73—54)

My invention relates to the type of gauges or indicators for indicating the level of a liquid which consists of a container for a vertical column of liquid, usually made of metal, having a glass plate or plates clamped thereto on the front of the gauge, through which the liquid may be observed. Extensive experience in the manufacturing and selling of such gauges has shown me weaknesses and defects which it is the object of my invention to correct.

I have found that, in the constructions previous to my present invention, the sides of the container, which support the glass, are liable to yield under the pressure within the gauge, and become distorted to such an extent that the glasses have broken.

Furthermore, in such prior gauges, unless great care is exercised, the glass plate is likely to be tipped backward, on one side of the container, when tightening the first of the clamping bolts which are to fasten it, with the result that the plate on the other side of the container is tipped forward and away from the container; and this results either in leaving an open crack between the container and the glass plate, or in fracturing the glass when trying to close the said crack.

It also is desirable to be able to clamp the glass more firmly on the container than is usually possible.

My invention overcomes or largely reduces the said defects, and to such ends, my invention consists in the gauge for indicating the level of liquids, hereinafter specified.

While I have chosen for illustration that form of my invention which is the best embodiment known to me, my invention is capable of embodiment in many different forms, and it is not to be limited to the precise form shown and described herein. In the accompanying drawing, Fig. 1 is a front elevation of a gauge embodying my invention. Figure 2 is a vertical, longitudinal sectional view taken on the line 2/2 of Fig. 1 and Fig. 3 is a horizontal, sectional view taken on the line 3/3 of Fig. 2.

The gauge comprises a liquid container A which is preferably formed of wrought steel but may be formed of any desired material. The said container has a chamber B formed therein and has threaded openings C at its top and bottom for connection with the boiler or other vessel having liquid therein, whose level it is desired to observe. The chamber B is open at the front, as shown in Fig. 3, and is closed by a glass plate D which is clamped against the edges of the walls E and E of the container, a gasket or packing L being placed between the glass and each of the said edges of the walls. The glass plate D is held in the said position by a cover or clamp G which has a recess H therein that is adapted to receive the glass plate and preferably closely to fit the outside walls of the container A, a window I being formed in the said cover or clamp, preferably of the same width as the chamber B.

This formation provides shoulders K between which and the glass a gasket or packing L is provided. The said parts are clamped together by a U-shape bolt M which closely fits the sides of the walls E and preferably also the back of the container. The arms of the bolt also pass through the cover G close to the glass D, and are threaded and provided with nuts N.

In the construction shown in the drawing, the container is long enough so that three glasses and their accompanying parts are desirable. Therefore, the container not only has the crossbars O at the top and bottom of the chamber upon which the glass and its interposed gasket may rest, but cross bars P are located across the chamber at intermediate points between the ends, so that three separate glasses can be used instead of one long one, thus reducing the danger of breakage and the cost of replacement of the glasses.

Because of the relatively high temperatures and pressures to which such liquid gauges as I have described are subjected, the requirements made of them are severe. The flat glass is much more desirable than round tubing for many reasons. The glass tube is much more easily broken, and its curvature produces refractive effects on the light rays which make it much more difficult to see the water level, than with the glass plate.

Moreover, it is desirable to provide the glass with vertical flutings Q on its inner face, as such flutings are visible when above the level of the liquid, and substantially invisible where the liquid contacts with them, and thus the level of the liquid is clearly indicated. These flutings are the subject of a patent before granted to me. It would, as a practical matter, be impossible to make such flutings on the inside of a glass tube.

However, the use of such a plate involves using a container having the walls E, which of course cannot be connected with each other across the window at the level where it is desired to have the liquid stand and for a sufficient region above and below that level, to indicate where the liquid actually stands at any given time. In gauges prior to my invention, these walls are unsupported, and I have found them to bulge outward laterally under the pressure of the steam or other gas or liquid within the chamber; and then leakage is liable to occur between the walls and the glass plate. Upon tightening the nuts to overcome the leakage, the plate is liable to be broken; because the edges of the walls E are no longer in a plane and therefore do not evenly support the glass.

I have discovered that the said bulging of the walls E can be reduced or overcome by making the arms of the bolt hug and support the said side walls E the said arms being held from spreading by passing through the holes in the cover G. In all such gauges prior to my invention, so far as known to me, the said arms of the bolt have stood away from the surfaces of the walls E and have afforded them no support.

Moreover, in the said prior gauges, the said arms of the bolt being spread apart, and not being close to the said walls, the nuts have borne upon the cover so far to one side that, when the first nut is tightened up to clamp the plate, it tends to pull the cover backward on the side where the said nut is located. This tends to tilt the glass and open a crack on the opposite side between the glass and the wall E and to cause a leak. It also has a tendency and often actually does chip or break the glass.

This disadvantage is largely overcome by placing the bolts closely against the side walls of the liquid container, since the nuts are thereby brought nearer to the center of the glass and to some extent overhang the portion of the glass which rests on the corresponding wall E. Thus, the tightening of the nut tends to keep the glass from tilting. Moreover, the said location of the bolts permits more pressure to be applied to the gasket because one side of the nut may overhang or project over the gasket.

Another advantage of my invention is that it enables a gauge to stand a substantially higher pressure than is possible in the said gauges prior to my invention.

I claim:

1. In a gauge, the combination of a liquid container having spaced side walls and a wall connecting said side walls, said walls forming a chamber which opens through the face of said container, a U-shaped bolt closely fitting said container and particularly embracing said sidewalls, a glass plate covering said chamber and resting upon the edges of said side walls, and a cover for holding said plate in position, the arms of said bolt passing through said cover and having means clamping said plate in position on said walls.

2. A gauge comprising a liquid container having spaced side walls and a wall connecting said side walls, said walls forming a chamber therein opening through the face thereof, a glass plate extending over said chamber and resting on said side walls, a gasket being interposed between said plate and said side walls, a cover resting on said plate and having a window therein in line with said chamber, a U-shaped bolt embracing said liquid container and closely fitting and supporting said side walls thereof and passing through said cover, and nuts threaded on the arms of said bolt, said nuts projecting over said gasket.

3. A gauge comprising a liquid container having a chamber therein opening through the face thereof and forming side walls, said container having a cross bar or cross bars extending across the said chamber, a plurality of glass plates resting upon the edges of said side walls and upon adjacent cross bars, a separate cover holding each of said glasses in position, U-shaped bolts closely fitting said container and particularly embracing said side walls, the arms of said bolts passing said covers and means for drawing said arms through said cover and clamping said plates in position on said walls.

PHILIP A. JERGUSON.

DISCLAIMER 1,947,910.—*Philip A. Jerguson*, West Medford, Mass. LIQUID GAUGE. Patent dated February 20, 1934. Disclaimer filed April 18, 1934, by the patentee.

Hereby enters this disclaimer to that part of the claim in said specification which is in the following words, to wit:

"These flutings are the subject of a patent before granted to me." (P. 1, line 101 et seq.)

[*Official Gazette May 8, 1934.*]

and below that level, to indicate where the liquid actually stands at any given time. In gauges prior to my invention, these walls are unsupported, and I have found them to bulge outward laterally under the pressure of the steam or other gas or liquid within the chamber; and then leakage is liable to occur between the walls and the glass plate. Upon tightening the nuts to overcome the leakage, the plate is liable to be broken; because the edges of the walls E are no longer in a plane and therefore do not evenly support the glass.

I have discovered that the said bulging of the walls E can be reduced or overcome by making the arms of the bolt hug and support the said side walls E the said arms being held from spreading by passing through the holes in the cover G. In all such gauges prior to my invention, so far as known to me, the said arms of the bolt have stood away from the surfaces of the walls E and have afforded them no support.

Moreover, in the said prior gauges, the said arms of the bolt being spread apart, and not being close to the said walls, the nuts have borne upon the cover so far to one side that, when the first nut is tightened up to clamp the plate, it tends to pull the cover backward on the side where the said nut is located. This tends to tilt the glass and open a crack on the opposite side between the glass and the wall E and to cause a leak. It also has a tendency and often actually does chip or break the glass.

This disadvantage is largely overcome by placing the bolts closely against the side walls of the liquid container, since the nuts are thereby brought nearer to the center of the glass and to some extent overhang the portion of the glass which rests on the corresponding wall E. Thus, the tightening of the nut tends to keep the glass from tilting. Moreover, the said location of the bolts permits more pressure to be applied to the gasket because one side of the nut may overhang or project over the gasket.

Another advantage of my invention is that it enables a gauge to stand a substantially higher pressure than is possible in the said gauges prior to my invention.

I claim:

1. In a gauge, the combination of a liquid container having spaced side walls and a wall connecting said side walls, said walls forming a chamber which opens through the face of said container, a U-shaped bolt closely fitting said container and particularly embracing said sidewalls, a glass plate covering said chamber and resting upon the edges of said side walls, and a cover for holding said plate in position, the arms of said bolt passing through said cover and having means clamping said plate in position on said walls.

2. A gauge comprising a liquid container having spaced side walls and a wall connecting said side walls, said walls forming a chamber therein opening through the face thereof, a glass plate extending over said chamber and resting on said side walls, a gasket being interposed between said plate and said side walls, a cover resting on said plate and having a window therein in line with said chamber, a U-shaped bolt embracing said liquid container and closely fitting and supporting said side walls thereof and passing through said cover, and nuts threaded on the arms of said bolt, said nuts projecting over said gasket.

3. A gauge comprising a liquid container having a chamber therein opening through the face thereof and forming side walls, said container having a cross bar or cross bars extending across the said chamber, a plurality of glass plates resting upon the edges of said side walls and upon adjacent cross bars, a separate cover holding each of said glasses in position, U-shaped bolts closely fitting said container and particularly embracing said side walls, the arms of said bolts passing said covers and means for drawing said arms through said cover and clamping said plates in position on said walls.

PHILIP A. JERGUSON.

DISCLAIMER 1,947,910.—*Philip A. Jerguson*, West Medford, Mass. LIQUID GAUGE. Patent dated February 20, 1934. Disclaimer filed April 18, 1934, by the patentee.

Hereby enters this disclaimer to that part of the claim in said specification which is in the following words, to wit:

"These flutings are the subject of a patent before granted to me." (P. 1, line 101 et seq.)

[*Official Gazette May 8, 1934.*]